United States Patent [19]

Beckley

[11] Patent Number: 4,821,452
[45] Date of Patent: Apr. 18, 1989

[54] SNAIL TRAP

[76] Inventor: Kenneth E. Beckley, 2251 Casa Alta, Spring Valley, Calif. 92078

[21] Appl. No.: 132,601

[22] Filed: Dec. 14, 1987

[51] Int. Cl.$^4$ .............................................. A01M 1/20
[52] U.S. Cl. ......................................... 43/131; 43/121
[58] Field of Search .......................... 43/131, 124, 121

[56] References Cited

U.S. PATENT DOCUMENTS

| 1,856,200 | 5/1932 | Tippey | 43/131 |
|---|---|---|---|
| 2,239,937 | 4/1941 | Smith | 43/131 |
| 2,710,485 | 6/1955 | Starr | 43/131 |
| 2,837,861 | 6/1958 | Graham | 43/131 |
| 2,950,562 | 8/1960 | Lothrop | 43/66 |
| 2,977,711 | 4/1961 | Starr | 43/131 |
| 3,772,820 | 11/1973 | Bond | 43/131 |
| 4,035,946 | 7/1977 | Rapp et al. | 43/131 |
| 4,277,907 | 7/1981 | Ernest | 43/131 |
| 4,485,582 | 12/1984 | Morris | 43/131 |

Primary Examiner—Kurt Rowan
Attorney, Agent, or Firm—Charles C. Logan, II

[57] ABSTRACT

A snail trap in the form of a housing having a dome-shaped top wall with cylindrical side walls extending downwardly therefrom. A plurality of snail entry archways are formed around the circumference of the side walls. A plurality of legs extend downwardly from the side walls for anchoring the snail trap in the ground. In actual use, a liquid or paste type of snail insecticide is first applied to the bottom surface of the ceiling of the dome as a toxic bait for slugs and snails. The snail trap is then placed on the ground and its legs are pushed into the soil up to the bottom of the archways.

4 Claims, 1 Drawing Sheet

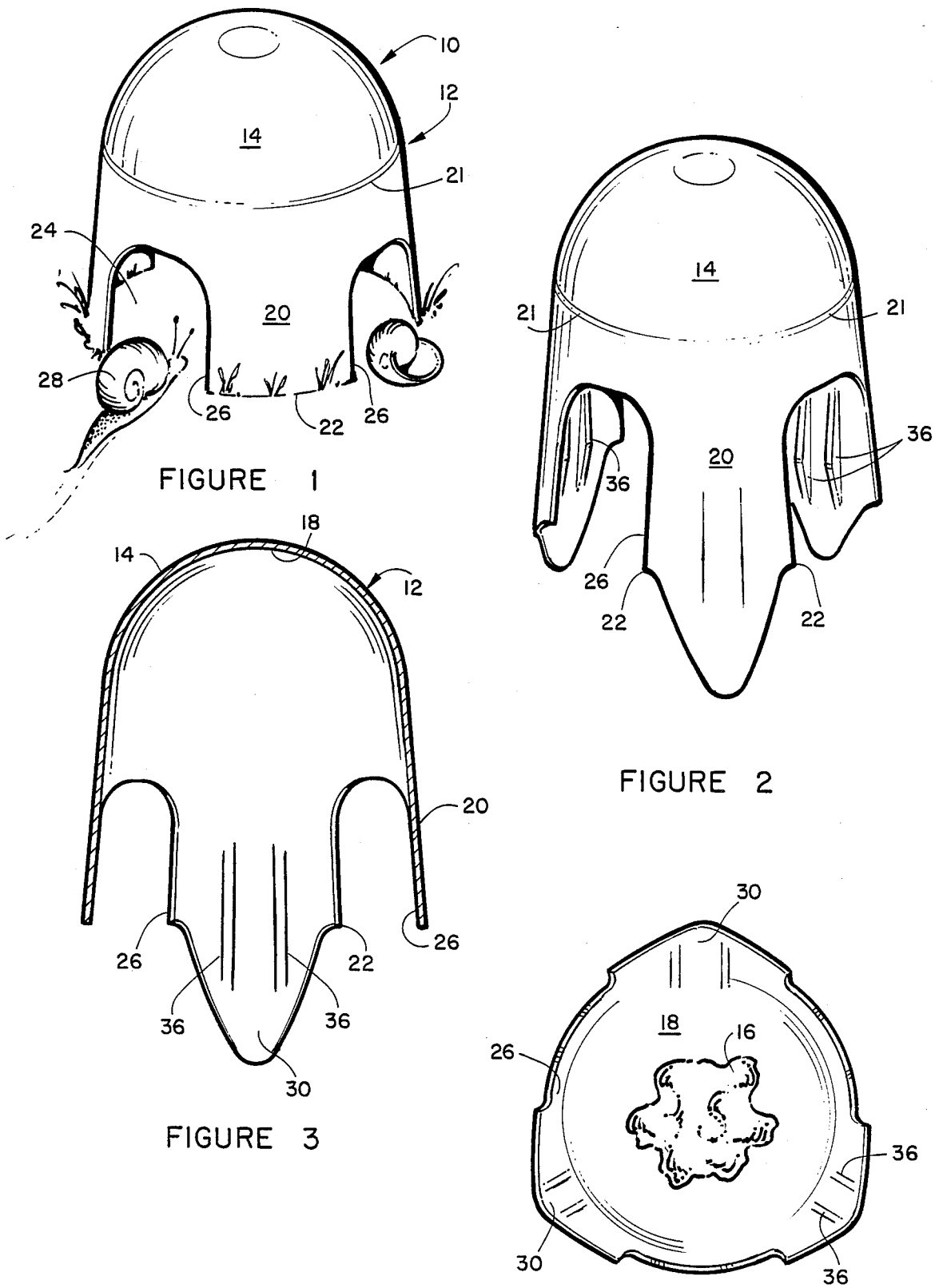

SNAIL TRAP

The invention relates to snails and slugs and more specifically to a trap for catching and exterminating them.

Presently, gardeners in various parts of the United States have a problem controlling the slug and snail population in their yards. During wet weather it sometimes seems as though they multiply overnight. There exist snail insecticides that can be used and they come in various forms such as liquid, paste, grains and pellets. Typically these are applied to the areas where the gardener wishes to eliminate the snail population.

One of the problems facing the gardener as he uses the available insecticides, is that they are exposed to rain and sprinkling systems. The water reduces the effectiveness of the insecticide by dilution or completely washing it away. Another problem resulting from the open exposed snail insecticide is that small toddlers, pets or wildlife animals might ingest the snail insecticide and possibly have it cause their death. Also in some instances the random spraying and dispensing of toxic pesticides can be injurious to exposed vegetation and harmful to bird life.

It is an object of the invention to provide a novel snail trap that is economical to manufacture and market.

It is also an object of the invention to provide a novel snail trap that prevents the application of the snail insecticide from being washed away by rain or water sprinkling systems.

It is another object of the invention to provide a novel snail trap that eliminates potential harm to animals and bird life from the snail insecticide which is used in combination with the snail trap.

It is a further object of the invention to provide a novel snail trap that is quickly and easily installed and removed by the gardener.

It is an additional object of the invention to provide a novel snail trap that is easily baited and also emptied.

SUMMARY OF THE INVENTION

Applicant's novel snail trap is in the form of a housing having a dome-shaped top wall and downwardly extending cylindrical side walls therefrom to form a chamber therewithin. A plurality of snail entry archways are formed in the sidewalls of the snail trap around its circumference. A plurality of legs extend downwardly from the side walls for anchoring the snail trap in the ground. The snail trap would preferably be integrally formed from plastic material. However, other structures could be used.

The novel snail traps would be used in domestic gardens or yards where random spraying or dispensing of toxic pesticides could be injurious to vegetation and harmful to animal and bird life. To be used, the snail trap would have several drops or applications of paste-type snail insecticide applied to the bottom surface of the ceiling of the dome as toxic bait for the snails or slugs. The snail trap then has its legs pushed into the ground, and since the bit is confined in the dome, the scent is intensified, thus providing greater attraction for the snail to enter the dome and consume the poisoned bait.

Due to the snail trap being anchored in the ground, the device is less apt to be blown about by the force of the wind. Also it is not subject to being dislodged by animals or birds. Therefore the snail trap is a deterrent for the consumption of the toxic bait by domestic animals or birds, as well as wild life. Additionally the bait confined within the dome is not subject to dilution or dissipation by rain or irrigation water that could cause contamination to soil and plants. Periodically the snail traps are inspected and disposal of dead snails and slugs and rebaiting are performed.

DESCRIPTION OF THE DRAWING

FIG. 1 is a perspective view illustrating the novel snail trap installed in the ground;

FIG. 2 is a front perspective view illustrating the novel snail trap;

FIG. 3 is a vertical cross sectional view of the snail trap; and

FIG. 4 is a bottom plan view of the novel snail trap illustrating snail insecticide paste applied to the bottom surface of the top wall.

DESCRIPTION OF THE PREFERRED EMBODIMENT

Applicant's novel snail trap will now be described by referring to FIGS. 1–4 of the drawing. The snail trap is generally designated numeral 10.

Snail trap 10 has a housing 12 having a top wall 14 that is dome-shaped. Snail insecticide 16 is applied to the bottom surface 18 of top wall 14. Side walls 20 have a top edge 21 and a bottom edge 22. Top wall 14 and side walls 20 form a chamber 24 therewithin. A plurality of snail entry archways 26 are formed around the circumference of side walls 20 and they have a generally inverted U-shaped configuration. Snails 28 enter through these archways 26.

A plurality of V-shaped legs or prongs 30 extend downwardly and slightly outwardly from the bottom edge 22 of the side walls 20. A plurality of vertically oriented ribs 36 are formed on the inner surface of side walls 20 and V-shaped legs 30 to give structural strength to the side walls and legs so that they do not easily break when forced into the ground.

What is claimed is:

1. A snail trap comprising:

a housing having a top wall and side walls that form a chamber therewithin, said top wall having a top surface and a bottom surface, said side walls having an inside surface, a top edge and a bottom edge;

a plurality of snail entry archways formed ins aid side walls, said entry archways having an inverted U-shape to them, and the bottom edge of said archways coincide with the bottom edge of said side walls;

a plurality of legs extending downwardly from said side walls for anchoring said snail trap by insertion into the ground, said legs having side edges, an inside surface and being V-shaped, said side edges having top ends that join the bottom edges of said respective entry archways, the inside surface of said legs having a concave configuration in its horizontal plane; and said housing and legs being integrally formed of plastic material.

2. A snail trap as recited in claim 1 wherein the top wall of said housing is dome-shaped and the walls of said housing are conical so that said snail traps can be stacked one upon another in a nesting relationship.

3. A snail trap as recited in claim 1 further comprising vertically oriented reinforcing ribs formed on the inside surface of said side walls and legs.

4. A snail trap as recited in claim 1 further comprising a predetermined amount of snail pesticide applied to the bottom surface of said top wall for enticing snails to enter said snail trap.

* * * * *